(No Model.)
S. H. SPRAGUE.
FIRE ESCAPE.
No. 401,598.              Patented Apr. 16, 1889.
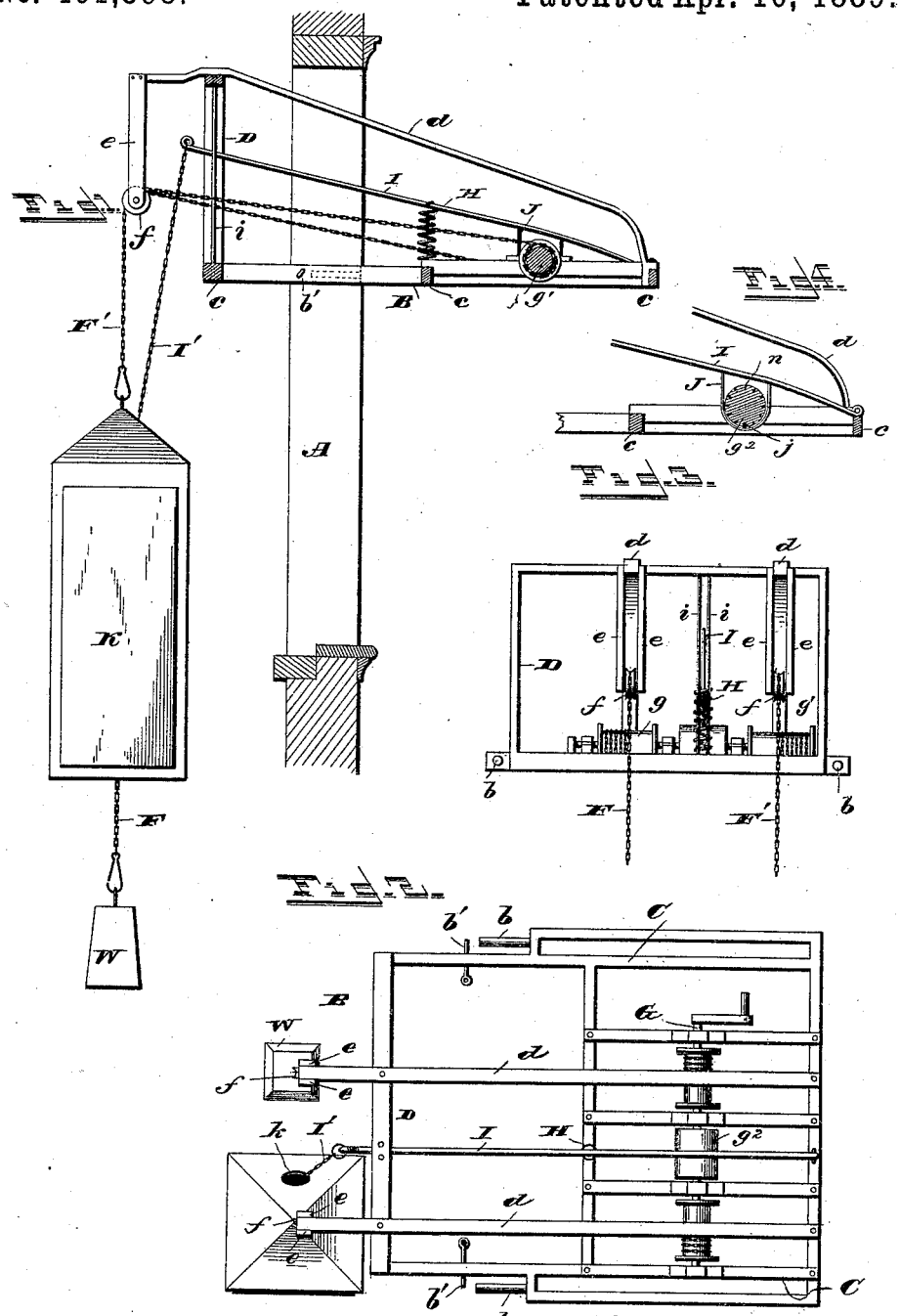
Samuel H. Sprague
INVENTOR
WITNESSES,

UNITED STATES PATENT OFFICE.

SAMUEL H. SPRAGUE, OF BELOIT, KANSAS.

FIRE-ESCAPE.

SPECIFICATION forming part of Letters Patent No. 401,598, dated April 16, 1889.

Application filed January 17, 1889. Serial No. 296,599. (No model.)

*To all whom it may concern:*

Be it known that I, SAMUEL H. SPRAGUE, a citizen of the United States of America, residing at Beloit, in the county of Mitchell and State of Kansas, have invented certain new and useful Improvements in Fire-Escapes; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to certain new and useful improvements in fire-escapes; and it consists in the construction and combination of the parts, as will be hereinafter fully set forth, and specifically pointed out in the claims.

In the accompanying drawings, Figure 1 is a side view showing my improvement applied to a window. Fig. 2 is a plan view. Fig. 3 is a front view, and Fig. 4 is a detail view.

The object of my invention is to provide a fire-escape for buildings which will have a cage or receptacle capable of being lowered by the occupant thereof at any desired rate of speed by drawing upon a chain or other flexible connection which passes through said cage and is attached to a brake-lever, so that said brake-lever may be brought in contact with a drum to prevent too rapid rotation of the shaft over which the chain to which the cage is attached passes, said shaft also being provided with a drum around which is passed a chain in opposite direction, so as to automatically wind said chain to raise the cage to the window when the cage is unoccupied.

In the drawings, A refers to a window, to which a frame, B, is suitably secured, preferably by inserting the pins $b\,b$ and $b'$ in perforations or eyebolts attached to the window-frame, so as to maintain the frame B in the position shown. The main portion of the frame B consists of the side beams, C C, suitably connected to each other by transverse beams $c\,c$, and to the outer portion thereof is secured a rectangular frame, D, from the upper portion of which project bars $d$, which extend inwardly and downwardly to the inner cross-beam $c$, to which the ends thereof are secured. The outer or projecting ends of these bars $d\,d$ are provided with depending strips $e\,e$, between the lower ends of which are secured pulleys $f\,f$, over which pass the chains or flexible connections F and F', these chains passing over the pulleys $f\,f$, and extend therefrom to the drums $g\,g'$, around which said chains are passed in opposite directions.

The shaft G has the drums $g$, $g'$, and $g^2$ rigidly attached thereto, and the outer end of the shaft is provided with a crank-handle, by means of which the shaft can be rotated when the occupants of the cage are unable to assist themselves. The shaft G is journaled in suitable bearings attached to the cross-pieces, as shown, and the central beam, $c$, is provided with a suitable spring, H, the upper end of which is attached to a rod, I, secured to the rear cross-beam $c$ of the main frame B, and after passing over the drum $g^2$ and between guide-rods $i\,i$ the projecting end thereof is provided with an eye, to which is secured a rope or chain, I', which is passed into the cage K through the opening $k$ in the upper part thereof.

The rod or brake-bar I is normally held out of contact with the drum $g^2$ by the spring; but when the chain I' is drawn upon the spring will be pressed so that the bar will contact with the drum and prevent the shaft rotating; and this rod or brake-bar is provided with a loop or bail, J, which is provided at its lower end with an upwardly-projecting lug or pin, $j$, which will engage with perforations or recesses $n$ in the periphery of the drum $g^2$, so that when the brake-bar is held in a raised position by the spring the rotation of the shaft G will be prevented, and thus the cage is prevented from descending until the rope I' is drawn upon to depress the brake-bar.

To the chain F is secured a weight, W, which is sufficient to counterbalance the weight of the cage and cause the same to be elevated as said weight descends.

In practice, in case of fire, the frame is secured to the window and the weight, which may have been placed within the cage, thrown out. This will cause the shaft to bring the cage opposite the window-opening, so that a person can enter said cage, and by drawing upon the chain or rope I' will cause the cage to descend gradually. The person's weight, combined with that of the cage, will raise the weight W by rotating the shaft, and when the occupant steps from said cage it will immediately rise to the window.

Having thus described my invention, what I claim as new, and desire to secure by Letters Patent, is—

1. The combination, in a fire-escape, of a suitable frame, B, having a shaft journaled therein, projecting bars *d d*, carrying pulleys *f f*, a brake-bar, I, secured to the inner side of said frame and provided with a spring, H, guide-bars *i i* therefor, flexible connections F and F', wound in different directions upon the shaft and provided at their ends with a cage and weight, and a flexible connection, I', extending from the projecting end of the brake-lever into the cage, so that the descent of the cage can be regulated, the parts being organized substantially as shown, and for the purpose set forth.

2. The combination, substantially as described, of the frame, the chain-drums fixed on a shaft journaled therein and provided with car-chains, the brake-drum fixed to the same shaft and provided with peripheral recesses, the brake-bar overhanging the brake-drum and provided with a pull-rope, and a band secured to the brake-bar to encircle the brake-drum and provided with a lug to engage the recesses in the drum.

In testimony whereof I affix my signature in presence of two witnesses.

SAMUEL H. SPRAGUE.

Witnesses:
THOMAS C. PERRY,
J. W. BARTLESON.